(12) United States Patent
Yoo et al.

(10) Patent No.: US 12,531,249 B2
(45) Date of Patent: *Jan. 20, 2026

(54) POSITIVE ELECTRODE AND SECONDARY BATTERY INCLUDING SAME

(71) Applicant: LG ENERGY SOLUTION, LTD., Seoul (KR)

(72) Inventors: Jung Woo Yoo, Daejeon (KR); Ye Lin Kim, Daejeon (KR); Tae Gon Kim, Daejeon (KR)

(73) Assignee: LG ENERGY SOLUTION, LTD, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,948

(22) Filed: Mar. 4, 2024

(65) Prior Publication Data

US 2025/0038185 A1    Jan. 30, 2025

Related U.S. Application Data

(63) Continuation of application No. 16/958,925, filed as application No. PCT/KR2019/001479 on Feb. 1, 2019, now Pat. No. 11,929,496.

(30) Foreign Application Priority Data

Feb. 7, 2018 (KR) .......................... 10-2018-0015313

(51) Int. Cl.
*H01M 4/00*  (2006.01)
*H01M 4/04*  (2006.01)
(Continued)

(52) U.S. Cl.
CPC ......... *H01M 4/625* (2013.01); *H01M 4/0404* (2013.01); *H01M 4/133* (2013.01);
(Continued)

(58) Field of Classification Search
CPC ...... H01M 4/38; H01M 4/0404; H01M 4/133; H01M 4/1393; H01M 4/625
See application file for complete search history.

(56) References Cited

U.S. PATENT DOCUMENTS 11,929,496 B2 *  3/2024  Yoo .................... H01M 4/0404
2008/0111110 A1 *  5/2008  Ma ........................... H01G 11/24
252/500

(Continued)

FOREIGN PATENT DOCUMENTS

CN    107004472 A    8/2017
CN    107046815 A    8/2017
(Continued)

OTHER PUBLICATIONS

Intenational Search Report for PCT/KR2019/001479 mailed May 10, 2019; 2 pages.
(Continued)

*Primary Examiner* — Nicholas P D'Aniello
(74) *Attorney, Agent, or Firm* — K&L Gates LLP (57) ABSTRACT

A positive electrode and a secondary battery including the same are provided. The positive electrode includes a current collector and a positive electrode active material layer disposed on the current collector, wherein the positive active material layer includes a positive electrode active material, a binder, and a multi-walled carbon nanotube, wherein the multi-walled carbon nanotube has an average length of 1-2 µm and has a length standard deviation of 0.5 µm or less.

22 Claims, 3 Drawing Sheets

(51) Int. Cl.
*H01M 4/133* (2010.01)
*H01M 4/1393* (2010.01)
*H01M 4/38* (2006.01)
*H01M 4/62* (2006.01)
*H01M 10/0525* (2010.01)

(52) U.S. Cl.
CPC ........... *H01M 4/1393* (2013.01); *H01M 4/38* (2013.01); *H01M 4/623* (2013.01); *H01M 10/0525* (2013.01); H01M 2220/20 (2013.01)

(56) References Cited

U.S. PATENT DOCUMENTS

| | | |
|---|---|---|
| 2011/0262796 A1 | 10/2011 | Shimooka et al. |
| 2014/0011092 A1 | 1/2014 | Yamamoto et al. |
| 2015/0064538 A1 | 3/2015 | Bosnyak et al. |
| 2016/0200577 A1 | 7/2016 | Cornwell et al. |
| 2017/0066907 A1 | 3/2017 | Choi et al. |
| 2017/0331112 A1 | 11/2017 | Nakamura et al. |
| 2017/0365858 A1 | 12/2017 | Yun et al. |
| 2018/0159131 A1 | 6/2018 | Seol et al. |
| 2018/0198129 A1 | 7/2018 | Kim et al. |

FOREIGN PATENT DOCUMENTS

| | | |
|---|---|---|
| JP | H06157016 A | 6/1994 |
| JP | 2010-105909 A | 5/2010 |
| JP | 2014019619 A | 2/2014 |
| JP | 2015185229 A | 10/2015 |
| JP | 2017523116 A | 8/2017 |
| JP | 2017-206413 A | 11/2017 |
| JP | 2018501602 A | 1/2018 |
| KR | 20110092274 A | 8/2011 |
| KR | 2012-0094511 A | 7/2014 |
| KR | 20160146580 A | 12/2016 |
| KR | 20170063402 A | 6/2017 |
| KR | 20170072027 A | 6/2017 |
| KR | 101764455 B1 | 8/2017 |
| KR | 20170111740 A | 10/2017 |
| KR | 20170127240 A | 11/2017 |
| WO | 2014077252 A1 | 5/2014 |
| WO | 2014112436 A1 | 7/2014 |
| WO | 2017074124 A1 | 5/2017 |
| WO | 2017099272 A1 | 6/2017 |

OTHER PUBLICATIONS

Extended European Search Report for Application No. 19751927.5 dated Dec. 8, 2020, 6 pages.
Shim Hyung Cheoul et al., "High-performance LiMn0.8Fe0.2PO4 with hybrid conductive additives based on functionalized and etched multi-walled carbon nanotubes by self-destruction during the lithiation process", Journal of Alloys and Compounds, Elsevier Sequoia, Lausanne, CH, vol. 649, Jul. 29, 2015, pp. 1315-1322, XP029267015, ISSN: 0925-8388, DOI: 10.1016/J.JALLCOM.2015. 07.253.
Machine translation of JPH06157016A (Year: 1994).
Machine translation of WO2014112436A1 (Year: 2014).
Dong, Qian., et al., "Mechanics of Carbon Nanotubes". Advances in Mechanics, Applied Mechanics Reviews American Society of Mechanical Engineers), vol. 34, No. 1, Feb. 2004, pp. 97-138.
Search Report dated Sep. 25, 2022 from Office Action for Chinese Application No. 201980006999.1 issued Oct. 9, 2022. 3 pgs.
U.S. Appl. No. 18/424,081—Non-Final Office Action mailed on Feb. 3, 2025.
Final Office Action issued to related U.S. Appl. No. 18/424,081, dated Aug. 28, 2025, 17 pages.

\* cited by examiner

POSITIVE ELECTRODE AND SECONDARY BATTERY INCLUDING SAME

INCORPORATION BY REFERENCE

Any and each application to which a priority claim is made in the Application Data Sheet is hereby incorporated by reference in its entirety.

FIELD

The present invention relates to a positive electrode and a secondary battery including the same, the positive electrode including a current collector and a positive electrode active material layer disposed on the current collector, wherein the positive active material layer includes a positive electrode active material, a binder, and a multi-walled carbon nanotube, wherein the multi-walled carbon nanotube has an average length of 1-2 μm and has a length standard deviation of 0.5 μm or less.

BACKGROUND ART

Discussions in this section do not constitute an admission of prior art. In recent years, with the development of technology and demand for mobile devices, demand for a battery as an energy source has been rapidly increased, and accordingly, various studies on a battery have been conducted to meet various demands. Particularly, a study for a lithium secondary battery having a high energy density and excellent life-time and cycle characteristics as a power source of such devices has been actively conducted.

The lithium secondary battery means a battery in which an electrode assembly, which includes: a positive electrode containing a positive electrode active material capable of intercalating/deintercalating lithium ions; a negative electrode containing a negative electrode active material capable of intercalating/deintercalating lithium ions; a micro-porous separator interposed between the positive electrode and the negative electrode; and a non-aqueous electrolyte containing lithium ions, is included.

The positive electrode and/or the negative electrode may include a conductive material to improve conductivity. Conventionally, a dot-type conductive material such as carbon black has been mainly used, but when a content of the conductive material is increased to improve the conductivity, an amount of the positive electrode active material or the negative electrode active material is relatively decreased, and accordingly, it is difficult to achieve a high energy density of a battery. Therefore, there has been a demand for satisfying required output and durability of a required battery even with a small amount of the conductive material alone. Particularly, in a case of the positive electrode, the positive electrode active material itself has a level of low conductivity, and thus the above-described problems are exhibited much seriously.

To solve the problem, a method for using a nano-sized conductive material such as a carbon nanotube or a carbon nanofiber, which has a wide specific surface area and enables a large amount of conductive contact with a small amount, has been introduced. However, such a nano-sized conductive material is difficult to be smoothly dispersed in a positive electrode slurry, and thus, it is difficult to obtain desired conductivity unless the content of the conductive material in the positive electrode active material layer exceeds an appropriate level, for example, 1 wt %.

Accordingly, it has been required to develop a positive electrode capable of ensuring conductivity even with a small amount of a conductive material by improving dispersibility of the conductive material, and capable of improving output and life-time characteristics of a battery.

SUMMARY

Technical Problem

An aspect of the present invention provides a positive electrode and a secondary battery including the same, the positive electrode being capable of ensuring conductivity thereof even when a content of a conductive material is drastically reduced to improve life-time characteristics of a battery, and capable of increasing a content of a positive electrode active material to improve output characteristics of a battery.

Technical Solution

According to an aspect of the present invention, there is provided a positive electrode including a current collector and a positive electrode active material layer disposed on the current collector, wherein the positive electrode active material layer includes a positive electrode active material, a binder, and a multi-walled carbon nanotube, wherein the multi-walled carbon nanotube has an average length of 1-2 μm and has a length standard deviation of 0.5 μm or less.

According to another aspect of the present invention, there is provided a secondary battery including: the positive electrode; a negative electrode; a separator interposed between the positive electrode and the negative electrode; and an electrolyte.

Advantageous Effects

According to the present invention, a multi-walled carbon nanotube is used as a conductive material, and the multi-walled carbon nanotube has an appropriate average length and an appropriate length standard deviation. Accordingly, positive electrode active materials may be electrically and smoothly connected through the multi-walled carbon nanotubes in a produced positive electrode while the multi-walled carbon nanotube may be uniformly dispersed in a conductive material dispersed solution and a positive electrode slurry, thereby improving life-time characteristics of a battery. In addition, as dispersibility of the multi-walled carbon nanotube is improved, conductivity of the positive electrode may be ensured even with a small amount of the multi-walled carbon nanotube, thereby relatively increasing a content of a positive electrode active material, and accordingly, output characteristics of a manufactured secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION OF EMBODIMENTS

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode>

According to an aspect of the present invention, a positive electrode includes a current collector and a positive electrode active material layer disposed on the current collector, wherein the positive electrode active material layer includes a positive electrode active material, a binder, and a multi-walled carbon nanotube, wherein the multi-walled carbon nanotube has an average length of 1-2 μm and has a length standard deviation of 0.5 μm or less.

The current collector is not particularly limited as long as having electrical conductivity without causing any chemical changes in the battery. For example, the current collector may use copper, stainless steel, aluminum, nickel, titanium, sintered carbon, or aluminum or stainless steel of which surface is treated with carbon, nickel, titanium, silver, or the like. Specifically, a transition metal which adsorbs carbon well such as copper and nickel may be used as a current collector.

The positive electrode active material layer may be disposed on one side or both sides of the current collector. The positive electrode active material layer may include a positive electrode active material, a binder, and a multi-walled carbon nanotube.

The positive electrode active material may be the same as the positive electrode active material contained in the positive electrode slurry of the described embodiment. Specifically, the positive active material may be the conventionally used positive electrode active material. Specifically, the positive electrode active material may be: a layered compound formed of, such as lithium cobalt oxide ($LiCoO_2$) or lithium nickel oxide ($LiNiO_2$), or a compound substituted with one or more transition metals; lithium manganese oxide represented by formula such as $Li_{1+y1}Mn_{2-y1}O_4$ ($0 \leq y1 \leq 0.33$), $LiMnO_3$, $LiMn_2O_3$, or $LiMnO_2$; lithium copper oxide ($Li_2CuO_2$); vanadium oxide such as $LiV_3O_8$, $V_2O_5$, or $Cu_2V_2O_7$; Ni-site type lithium nickel oxide represented by formula such as $LiNi_{1-y2}M1_{y2}O_2$ (wherein, M1 is Co, Mn, Al, Cu, Fe, Mg, B, or Ga, and $0.01 \leq y2 \leq 0.3$); lithium manganese composite oxide represented by formula such as $LiMn_{2-y3}M2_{y3}O_2$ (wherein, M2 is Co, Ni, Fe, Cr, Zn, or Ta, and $0.01 \leq y3 \leq 0.1$) or $Li_2Mn_3M_3O_8$ (wherein, M3 is Fe, Co, Ni, Cu, or Zn); or $LiMn_2O_4$ in which a portion of Li in the formula is substituted with an alkaline earth metal ion, but the embodiment is not limited thereto. Specifically, the positive electrode active material may be $Li[Ni_{0.6}Mn_{0.2}Co_{0.2}]O_2$.

The positive electrode active material may be contained in an amount of 96-99 wt %, specifically 97-98.5 wt %, with respect to the total weight of the positive electrode active material layer. When the above range is satisfied, contents of the multi-walled carbon nanotube and the binder are not excessively reduced while output of a battery may be improved, thereby maintaining life-time characteristics of a battery.

The binder may be the same as the binder contained in the positive electrode slurry of the described embodiment. Specifically, the binder may contain at least any one selected from the group consisting of a polyvinylidenefluoride-hexafluoropropylene copolymer (PVDF-co-HFP), polyvinylidenefluoride, polyacrylonitrile, polymethylmethacrylate, and materials in which hydrogen atom(s) thereof is (are) substituted with Li, Na, or Ca, etc., or may contain various copolymers thereof. For example, the binder may be polyvinylidenefluoride which has a functional group such as a carboxyl group or an ether group.

The multi-walled carbon nanotube may mean a carbon nanotube having two or more graphene-layers disposed parallel to an axis of the carbon nanotube, that is, may mean a carbon nanotube having two or more walls. In the present invention, the carbon nanotube having appropriate length and length standard deviation may be formed during a dispersion process of the conductive material dispersed solution.

The average length of the multi-walled carbon nanotube may be 1-2 μm, specifically 1.1-1.4 μm, and more specifically from 1.1-1.2 μm. When the average length of the multi-walled carbon nanotube is less than 1 μm, a plurality of multi-walled carbon nanotubes having excessively short lengths may be present, and as a result, the electrical connections between the positive electrode active materials cannot be smooth, thereby deteriorating the output of a battery. Meanwhile, when the average length of the multi-walled carbon nanotube exceeds 2 μm, a plurality of multi-walled carbon nanotubes having an excessively long lengths may be present, and as a result, the multi-walled carbon nanotubes may be easily entangled in the conductive dispersed solution and the positive electrode slurry. Accordingly, the multi-walled carbon nanotubes cannot be uniformly dispersed in the positive electrode active material layer to deteriorate the conductivity of the positive electrode active material layer, thereby deteriorating the output and life-time characteristics of a battery.

On the other hand, "the average length exceeds 2 μm" means that the lengths of the multi-walled carbon nanotubes are not sufficiently shortened, and this may be caused by lack of a process for controlling particle size distribution such as a milling process. Therefore, when the average length exceeds 2 μm, the length standard deviation of the multi-walled carbon nanotubes also cannot help being large, and specifically cannot help but to exceed 0.5 μm.

The length standard deviation of the multi-walled carbon nanotube may be 0.5 μm or less, specifically 0.3-0.5 μm. When the length standard deviation of the multi-walled carbon nanotube exceeds 0.5 μm, length differences between the multi-walled carbon nanotubes may be large, and as a result, the conductivity in the positive electrode active material layer cannot be uniform, thereby deteriorating the output and life-time characteristics of a battery. Furthermore, the excessively large standard deviation may be caused by an insufficient particle size improvement process of the multi-walled carbon nanotube, such as a milling process, during preparation of the conductive material dispersed solution, and accordingly, dispersibility of the of multi-walled carbon nanotube in the conductive material dispersed solution and the positive electrode active material layer may be deteriorated, thereby further deteriorating the output and life-time characteristics of a battery. In addition, when the standard deviation is excessively large, viscosity of the conductive material dispersed solution and the positive electrode slurry may excessively increase, and accordingly, it is difficult for the positive electrode slurry to be smoothly applied during formation of the positive electrode active material layer, thereby further deteriorating the output and life-time characteristics of a battery.

The length of the multi-walled carbon nanotube may be 0.5-3.0 μm, specifically 0.7-2.5 μm. In the description, the length means not the described average length, but the respective length of the observed multi-walled carbon nanotube. When the above range is satisfied, the electrical connections between the positive electrode active materials are maintained at an appropriate level, and simultaneously, the dispersion of the multi-walled carbon nanotubes in the conductive material dispersed solution and the positive electrode slurry may be uniform. Even when the multi-walled carbon nanotubes having a length exceeding 3.0 μm are contained in the positive electrode active material layer in a small amount, aggregation occurs between the multi-walled carbon nanotubes due to the multi-walled carbon nanotubes having long lengths, and accordingly, it is difficult for multi-walled carbon nanotubes to be uniformly dispersed, thereby deteriorating the output and life-time characteristics of a battery. In addition, when the multi-walled carbon nanotubes having long lengths are present, the aggregation occurs and the viscosity of the conductive material dispersed solution is increased, and thus, processability is deteriorated during preparation of the positive electrode active material layer, and as the processability is deteriorated, the dispersibility of the multi-walled carbon nanotubes may be further lowered.

With respect to the multi-walled carbon nanotube contained in the positive electrode active material layer, the average length, the length standard deviation, and the length of the described multi-walled carbon nanotube may be measured by the following method. First, a certain amount of the positive electrode active material layer is diluted with an NMP solution having a weight of several tens times thereof, and then, the materials constituting the positive electrode active material layer are respectively separated through ultrasonic waves. Thereafter, a portion of the upper layer of the solution is extracted and diluted again with an NMP solution having a weight of several tens times of the extracted amount. Thereafter, the respective lengths of a plurality of multi-walled carbon nanotubes, for example, 30 or 25 multi-walled carbon nanotubes, were observed through a scanning electron microscope (SEM), and then, the average and standard deviation thereof are calculated and the average length, the length standard deviation, and the length of the described multi-walled carbon nanotube are derived.

The multi-walled carbon nanotube may be contained in an amount of 0.1-1 wt % with respect to the total weight of the positive electrode active material layer, specifically may be contained in an amount of 0.2-0.9 wt %, more specifically may be contained in an amount of 0.2-0.7 wt %. When the above range is satisfied, the conductivity of the positive electrode active material layer may be ensured.

When the multi-walled carbon nanotube is contained in an amount of 1 wt % or less, and particularly 0.7 wt % or less, it is difficult to be achieved with only the carbon nanotube having general properties. Specifically, when the content of the relatively general carbon nanotube is reduced to a level of 1 wt % or less to increase the content of the positive electrode active material, the electrical connections between the positive electrode active materials cannot be smoothly performed, thereby having no option but to inevitably and greatly deteriorate the output characteristics of a secondary battery. In addition, the positive electrode active materials cannot be supported smoothly by the carbon nanotubes, and as a result, the positive electrode active materials are easily separated from the positive electrode active material layer or a structure of the positive electrode active material layer is easy to be gradually collapsed, thereby deteriorating the mechanical stability of the positive electrode. Accordingly, the cycle characteristics of the manufactured secondary battery cannot help being inevitably deteriorated.

Meanwhile, in the present invention, the positive electrode active material layer includes the multi-walled carbon nanotubes having appropriate physical properties such as an average length and a length standard deviation in a uniformly dispersed state, and accordingly, the electrical connections between the positive electrode active materials may be maintained even when the content of the multi-walled carbon nanotube is 1 wt % or less and the mechanical stability of the positive electrode active material layer may be ensured, thereby improving the output and life-time characteristics of a battery. In addition, as the content of the multi-walled carbon nanotube is maintained at a low-level of 1 wt % or less, the positive electrode active material layer may include relatively a larger amount of the positive electrode active material, thereby further improving the output of the manufactured battery.

A loading amount of the positive electrode active material layer may be 15-40 $mg/cm^2$, specifically 20-30 $mg/cm^2$. When the above range is satisfied, a thickness of the positive electrode cannot be excessively increased while ensuring energy density of the positive electrode, and also, a problem of processability during applying the positive electrode slurry cannot occur.

<Method for Producing Positive Electrode>

According to another aspect of the present invention, a method for producing a positive electrode includes: a step for preparing a conductive material dispersed solution; a step for forming a positive electrode slurry containing the conductive material dispersed solution, a positive electrode active material, a binder, and a solvent; and a step for applying and drying the positive electrode slurry on a current collector, wherein the conductive material dispersed solution contains a multi-walled carbon nanotube, a dispersant, and a dispersion medium, and the multi-walled carbon nanotube has an average length of 1-2 μm and has a length standard deviation of 0.5 μm or less.

The step for preparing a conductive material dispersed solution may include: mixing a bundle-type multi-walled carbon nanotube, a dispersant, and a dispersion medium to form a mixture; and controlling a particle size distribution of the bundled multi-walled carbon nanotube.

The dispersant may be at least one selected from the group consisting of hydrogenated nitrile butadiene rubber (H-NBR), polyvinylpyrrolidone (PVP), and carboxymethylcellulose (CMC).

The dispersion medium may be at least one among N-methyl-2-pyrrolidone (NMP) and water.

In the bundle-type multi-walled carbon nanotube, the bundle-type refers to a secondary shape of a bundle shape or a rope shape in which axes in a longitudinal direction of a plurality of carbon nanotube units are arranged in parallel with a substantially same orientation or are entangled in a substantially same orientation. The bundle-type multi-walled carbon nanotube has a shape in which the carbon nanotubes are partially aggregated and has an excessively various lengths, and thus, when the bundle-type multi-walled carbon nanotube is directly used as a conductive material without controlling shape and length thereof, it is difficult for the carbon nanotubes to be dispersed uniformly in the positive electrode active material layer and it is difficult to ensure a conductive path therein. Accordingly, a process for controlling the particle size distribution, that is, the shape and length of the bundle-type multi-walled carbon nanotube is required after mixing the bundle-type multi-walled carbon nanotube, the dispersant, and the dispersion medium.

Particularly, since the carbon nanotubes having lengths of 5-50 μm are randomly aggregated, the bundle-type multi-walled carbon nanotube immediately after completion of the synthesis has a particle shape of several tens of μm in total size. A pellet is conventionally prepared with the bundle-type multi-walled carbon nanotubes for ease of handling such as transportation, storage, and injection. Therefore, a milling process that the pellet is disassembled to separate the bundle-type carbon nanotubes from each other and make the lengths uniform is required to be used as a conductive material in the positive electrode.

Controlling the particle size distribution may be performed through a method such as milling or ultrasonic treatment, preferably by a milling method. The milling may be performed by a ball mill, a spike mill, a bead mill, a basket mill, or an attrition mill, etc., and specifically, by a spike mill.

A milling by the spike mill may be performed in the following manner. The spike mill is operated while injecting the mixture containing the bundle-type carbon nanotube, the dispersant, and the dispersion medium into spike mill machine filled with beads. During operation, a rotor inside the machine rotates, and the rotational force gives kinetic energy to the beads, and accordingly, dispersion of the bundle-type carbon nanotube in the mixture occurs. Thereafter, the mixture is discharged through an outlet at a specific discharge rate. The process may be performed under specific conditions to form a multi-walled carbon nanotube included in the positive electrode of the present invention. Particularly, a size of the beads, a filling amount of the beads, a discharging speed of the mixture, and the milling number are the main conditions, and the conductive material dispersed solution used in the present invention may be formed by an appropriate combination thereof. In other words, it is required that the combination of each of the above conditions is suitably satisfied as well as the range of each of the above conditions.

A size of the beads may be 0.5-2 mm, specifically 0.6-1 mm, and more specifically, 0.6-0.75 mm. When the size of the beads exceeds 2 mm, shear force generated by the beads is insufficient, and accordingly, dispersion and particle size distribution of the multi-walled carbon nanotubes cannot reach a desirable level. In addition, when the size of the beads is less than 0.5 mm, the beads as well as the mixture are discharged together to the outlet, and accordingly, there are problems that the dispersibility of the spike mill is not maintained constant and a separate process for separating the beads from the discharged product is required.

A filling amount of the beads may be 50-90%, and specifically 65-80%. When the filling amount of the beads exceeds 90%, a pressure inside the spike mill is greatly increased, thereby continuously using the spike mill. When the filling amount of the beads is less than 50%, it is difficult to form suitable kinetic energy necessary for dispersion.

A discharge speed of the mixture may be 1-5 kg/min, and specifically 2-4 kg/min.

The milling number means the number of the mixture being injected into a container. The milling number may be 2-3 times.

Viscosity of the conductive material dispersed solution may be 10,000-30,000 cps at 30-50° C., and specifically 15,000-25,000 cps. When the above range is satisfied, the conductive material dispersed solution may be easily injected during preparing the positive electrode slurry. Furthermore, satisfying the viscosity means that the multi-walled carbon nanotube is smoothly dispersed and the particle size distribution satisfies a desirable level.

In the step for forming a positive electrode slurry, the positive electrode slurry may contain the conductive material dispersed solution, a positive electrode active material, a binder, and a solvent.

The positive electrode active material, the binder, the multi-walled carbon nanotube, and the current collector are the same as the positive electrode active material, the binder, and the multi-walled carbon nanotube contained in the positive electrode of the described embodiment, thus the detailed descriptions thereof are omitted. Meanwhile, the average length, the length standard deviation, and length of the multi-walled carbon nanotube contained in the conductive material dispersed solution may be maintained equally in the positive electrode active material layer.

The solvent may be at least one selected from the group consisting of dimethyl sulfoxide (DMSO), isopropyl alcohol, N-methyl-2-pyrrolidone (NMP), a polyvinylidene fluoride-hexafluoropropylene copolymer (PVDF-co-HFP) solution, a polyvinylidenefluoride solution, acetone, and water. The solvent may be, for example, NMP.

A solid content of the positive electrode slurry may be 60-80 wt % with respect to the total weight of the positive electrode slurry, and specifically 65-75 wt %. When the above range is satisfied, there are advantages that the positive electrode slurry may be easily dried while maintaining a viscosity enough to apply the positive electrode slurry on the current collector, and the preferable viscosity of the positive electrode slurry may be 5,000-25,000 cps.

Since the positive electrode active material layer is prepared by drying the positive electrode slurry and removing the solvent, the respective content of the positive electrode active material, the binder, and the multi-walled carbon nanotube contained in the solid content with respect to the described total solid weight of the positive electrode slurry is equal to the value with respect to the total weight of the positive electrode active material layer contained in the positive electrode of the described embodiment.

In the step for applying and drying the positive electrode slurry on the current collector, the coating and drying the current collector coated with the positive electrode slurry may be performed at a temperature of 100-180° C. and at a rate of 4-80 m/min. A rolling process may also be performed to control a thickness of the positive electrode after drying, and an additional drying process may be performed to remove the residual moisture of the positive electrode after rolling.

<Secondary Battery>

According to another aspect of the present invention, a secondary battery includes: a positive electrode; a negative electrode; a separator interposed between the positive electrode and the negative electrode; and an electrolyte. Hereinafter, the positive electrode is the same as the positive electrode of the described embodiment, and accordingly, description of the positive electrode will be omitted.

The negative electrode may include a negative electrode current collector and a negative electrode active material layer disposed on one side or both sides of the negative electrode current collector.

The negative electrode current collector is not particularly limited as long as having electrical conductivity without causing any chemical changes in the battery. For example, the negative electrode current collector may use copper, stainless steel, aluminum, nickel, titanium, sintered carbon, or aluminum or stainless steel of which surface is treated with carbon, nickel, titanium, silver, or the like. Specifically, a transition metal which adsorbs carbon well such as copper and nickel may be used as a negative electrode current collector.

The negative electrode active material layer may include a negative electrode active material, a negative electrode conductive material, and a negative electrode binder.

The negative electrode active material may be a graphite-based active material particle or a silicon-based active material particle. The graphite-based active material particle may use at least one selected from the group consisting of artificial graphite, natural graphite, a graphitized carbon fiber, and a graphitized mesocarbon microbead, and particularly, when artificial graphite is used, rate characteristics may be improved. The silicon-based active material particle may use at least one selected from the group consisting of Si, $SiO_x$ (0<x<2), a Si—C composite, and a Si—Y alloy (wherein, Y is an element selected from the group consisting of an alkali metal, an alkaline earth metal, a transition metal, a Group 13 element, a Group 14 element, a rare earth element, and a combination thereof), and particularly, when Si is used, a high capacity battery may be obtained.

The negative electrode binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated-EPDM, a styrene butadiene rubber (SBR), a fluorine rubber, polyacrylic acid, and a material in which hydrogen is substituted with Li, Na, or Ca, etc., and may also include various copolymers thereof.

The negative electrode conductive material is not particularly limited as long as having electrical conductivity without causing any chemical changes in the battery, and the negative electrode conductive material may use, for example: graphite such as natural graphite and artificial graphite; carbon black such as carbon black, acetylene black, Ketjen black, channel black, furnace black, lamp black, and thermal black; a conductive fiber such as a carbon fiber and a metal fiber; a conductive tube such as a carbon nanotube; a metal powder such as fluorocarbon powder, aluminum powder, and nickel powder; a conductive whisker such as zinc oxide and potassium titanate; a conductive metal oxides such as titanium oxide; or conductive materials such as polyphenylene derivatives, etc.

The separator serves to separate the negative electrode and the positive electrode from each other and provide a transfer channel for lithium ions, and any separator may be used without particular limitation as long as typically used in a secondary battery, and particularly, a separator having excellent electrolyte-retention ability as well as low resistance to transfer of the electrolyte ions may be preferably used for the separator. Specifically, a porous polymer film, for example, a porous polymer film formed of a polyolefin-based polymer (e.g., an ethylene homopolymer, a propylene homopolymer, an ethylene/butene copolymer, an ethylene/hexene copolymer, and an ethylene/methacrylate copolymer), or a laminated structure having two or more layers thereof may be used. In addition, a typical porous nonwoven fabric, for example, a nonwoven fabric formed of a glass fiber having a high melting point or a polyethylene terephthalate fiber may be used. Alternatively, a coated separator containing a ceramic component or a polymer material may be used to ensure heat resistance or mechanical strength, and either a single layer structure or a multilayer structure may be selectively used.

Examples of the electrolyte may include an organic-based liquid electrolyte, an inorganic-based liquid electrolyte, a solid polymer electrolyte, a gel-type polymer electrolyte, a solid inorganic electrolyte, and a molten-type inorganic electrolyte which are available in production of a lithium secondary battery, but the embodiment is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, etc. may be used.

Particularly, ethylene carbonate and propylene carbonate, which are cyclic carbonates among the carbonate-based organic solvent, may be preferably used because the carbonate-based organic solvents have a high viscosity and a high dielectric constant to easily dissociate a lithium salt, and when dimethyl carbonate and diethyl carbonate, which are linear carbonates having a low viscosity and a low dielectric constant, are added to the cyclic carbonates and mixed in an appropriate ratio, an electrolyte having a high electric conductivity may be prepared, and the electrolyte prepared in this way may be more preferably used.

The metal salt may use a lithium salt, and the lithium salt may be easily soluble in the non-aqueous electrolyte, and an anion of the lithium salt may use one selected from the group consisting of, for example, $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, to improve life-time characteristics of a battery, suppress capacity reduction of a battery, and improve discharge capacity of a battery, the electrolyte may further contain one more additive of, for example, a halo-alkylene carbonate-based compound such as difluoroethylene carbonate, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N, N-substituted imidazolidine, ethylene glycol dialkyl ether, an ammonium salt, ethanol, aluminum pyrrole, 2-methoxy trichloride, or the like.

According to another aspect of the present invention, there are provided: a battery module including the secondary battery as a unit cell; and a battery pack including the same. Since the battery module and the battery pack include the secondary battery having a high capacity, enhanced rate performance, and high cycle characteristics, the battery module and the battery pack may be used as a power source of a middle-sized or large-sized device selected from a group consisting of electric vehicles, hybrid electric vehicles, plug-in hybrid electric vehicles, and a power storage system.

Hereinafter, the present invention will be described in more detail according to examples. However, the invention may be embodied in many different forms and should not be construed as being limited to the embodiments set forth herein.

EXAMPLES AND COMPARATIVE EXAMPLES

Example 1: Manufacture of Battery (1) Preparation of Conductive Material Dispersed Solution A bundle-type multi-walled carbon nanotube having a pellet form of a several cm size, H-NBR as a dispersant, and NMP as a dispersion medium were mixed at a weight ratio of 4:0.8:95.2 to form a mixture. The mixture was added into a spike mill filled with 80% beads having a size of 0.65 mm and dispersed, and then, the mixture was discharged at a discharge rate of 2 kg/min. The process was 2 times performed to prepare a conductive material dispersed solution containing a multi-walled carbon nanotube of which a particle size distribution is controlled.

(2) Production of Positive Electrode $Li(Ni_{0.6}Mn_{0.2}Co_{0.2})O_2$ as a positive electrode active material and PVdF as a binder were used. The positive electrode active material, the conductive material dispersed solution, and NMP were mixed to prepare a positive electrode slurry which has a solid content of 72% and in which a weight ratio of the positive electrode active material, the binder, the dispersant, and the multi-walled carbon nanotubes is 98:1.52:0.08:0.4.

The positive electrode slurry was applied to a positive electrode current collector (Al) having a thickness of 20 μm to have a solid content weight (a loading amount) of 21 mg/cm$^2$ and dried. Thereafter, the current collector coated with the positive electrode slurry was rolled by a rolling method to control the total thickness of 77 μm. Thereafter, the current collector was dried in a vacuum oven at 110° C. for 6 hours to prepare a positive electrode.

(3) Manufacture of Battery

Natural graphite as a negative electrode active material, carbon black as a negative electrode conductive material, styrene butadiene rubber (SBR) as a negative electrode binder, and CMC were mixed with distilled water at a weight ratio of 96.1:0.5:2.3:1.1, respectively, to prepare a negative electrode slurry. The prepared slurry was applied to a negative electrode current collector (Cu) having a thickness of 20 μm to have a solid content weight (a loading amount) of 10 mg/cm$^2$ and dried. Thereafter, the current collector coated with the negative electrode slurry was rolled by a rolling method to control the final thickness (thicknesses of the current collector and the active material layer) of 80 μm. Thereafter, the current collector was dried in a vacuum oven at 110° C. for 6 hours to prepare a negative electrode.

The produced negative electrode and positive electrode, and a porous polyethylene separator were assembled by using a stacking method, and an electrolyte solution (ethylenecarbonate (EC)/ethylmethylcarbonate (EMC)=1/2 (volume ratio), lithium hexafluorophosphate (1 mole of $LiPF_6$)) was injected into the assembled battery to manufacture a lithium secondary battery.

Example 2: Manufacture of Battery

A conductive material dispersed solution, a positive electrode, and a battery were prepared in the same manner as in Example 1 except that the bead size was changed to 1 mm when the conductive material dispersed solution was prepared.

Comparative Example 1: Manufacture of Battery

A conductive material dispersed solution, a positive electrode, and a battery were prepared in the same manner as in Example 1 except that the bead size was changed to 1 mm and the process was 1 time performed when the conductive material dispersed solution was prepared.

Comparative Example 2: Manufacture of Battery

A conductive material dispersed solution, a positive electrode, and a battery were prepared in the same manner as in Example 1 except that the process was 4 times performed when the conductive material dispersed solution was prepared.

Figure 1:
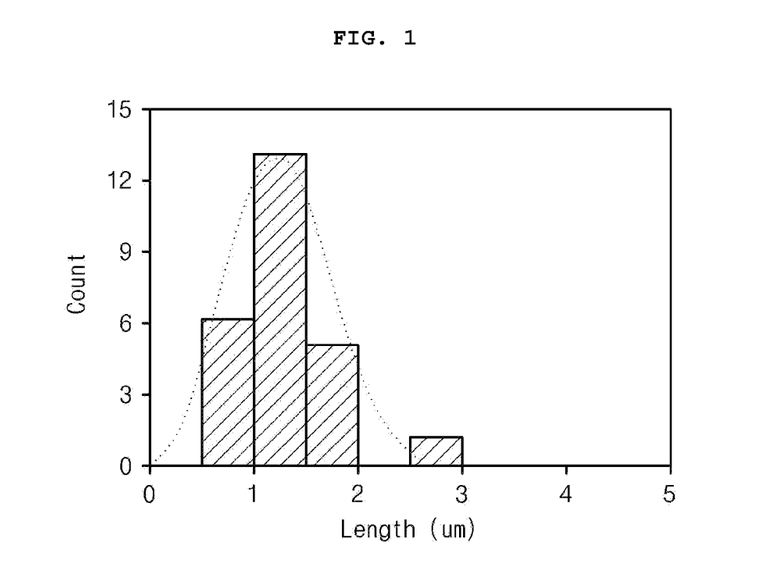
FIG. 1 is a graph showing lengths of multi-walled carbon nanotubes contained in a positive electrode used in Example 1 of the present invention.
Figure 2:
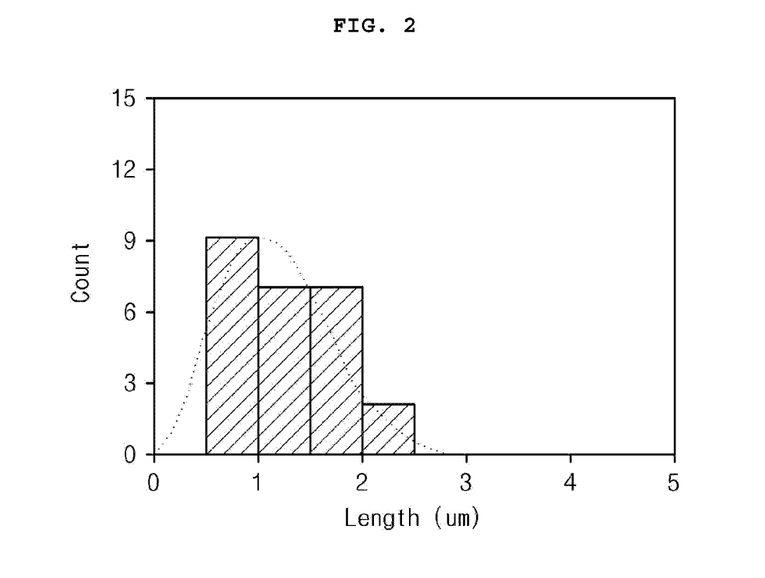
FIG. 2 is a graph showing lengths of multi-walled carbon nanotubes contained in a positive electrode used in Example 2 of the present invention.
Figure 3:
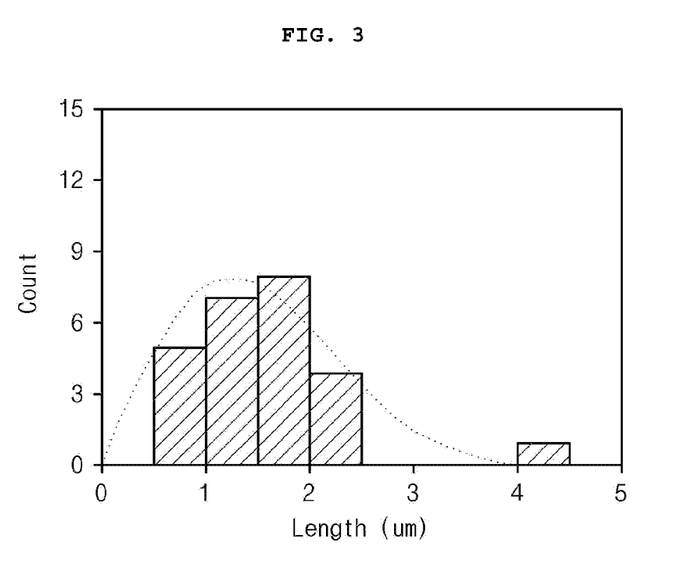
FIG. 3 is a graph showing lengths of multi-walled carbon nanotubes contained in a positive electrode used in Comparative Example 1 of the present invention.
Figure 4:
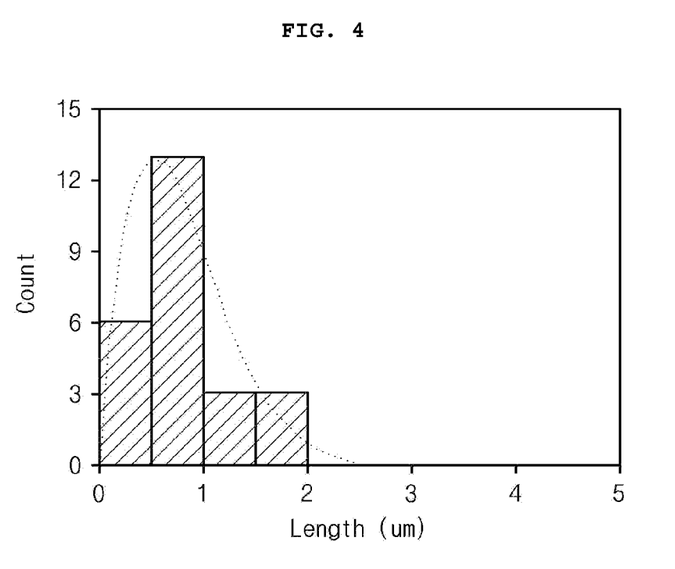
FIG. 4 is a graph showing lengths of multi-walled carbon nanotubes contained in a positive electrode used in Comparative Example 2 of the present invention.

Properties of the multi-walled carbon nanotube contained in the conductive material dispersed solution formed in a battery manufacture processes of Examples 1 and 2 and Comparative Examples 1 and 2 were measured through the following method, and the results are shown in FIG. 1 (the multi-walled carbon nanotube used in Example 1), FIG. 2 (the multi-walled carbon nanotube used in Example 2), FIG. 3 (the multi-walled carbon nanotube used in Comparative Example 1), FIG. 4 (the multi-walled carbon nanotube used in Comparative Example 2), and Table 1, respectively.

Specifically, NMP was further added to each of the conductive material dispersed solutions to prepare dilute solutions in which a content of the multi-walled carbon nanotube was 0.005 wt % with respect to the total weight of the solution. Each of the diluted solutions was dropped on a silicon wafer and dried to prepare respective samples, and the samples were observed by an SEM. At the time, the lengths of the observed 25 multi-walled carbon nanotubes were measured, and the average length, the length standard deviation, the maximum length, and the minimum length were derived on the basis of the measurement results.

TABLE 1

| | Properties of multi-walled carbon nanotube contained in conductive material dispersed solution | | | |
|---|---|---|---|---|
| | Average length (μm) | Length standard deviation (μm) | Maximum length (μm) | Minimum length (μm) |
| Example 1 | 1.26 | 0.45 | 2.68 | 0.59 |
| Example 2 | 1.16 | 0.50 | 2.38 | 0.50 |
| Comparative Example 1 | 1.56 | 0.81 | 4.50 | 0.50 |

TABLE 1-continued

| | Properties of multi-walled carbon nanotube contained in conductive material dispersed solution | | | |
|---|---|---|---|---|
| | Average length (μm) | Length standard deviation (μm) | Maximum length (μm) | Minimum length (μm) |
| Comparative Example 2 | 0.78 | 0.46 | 1.93 | 0.05 |

Experimental Example 1: Evaluation of Discharge Capacity and Battery Resistance According to Charging/Discharging Cycles Charging/discharging were performed for the secondary batteries manufactured in Examples 1 and 2 and Comparative Examples 1 and 2 to evaluate discharge capacity and battery resistance, and then, the results are shown in a graph of FIG. 5 and Table 2.

A first cycle and a second cycle were charged/discharged at 0.1 C, and from 3 cycles to 200 cycles, charging/discharging were performed at 0.5 C.

Charging conditions: CC (constant current)/CV (constant voltage) (4.2 V/0.05 C current cut-off)

Discharging conditions: CC (constant current) condition 2.7 V cut-off

Figure 5:
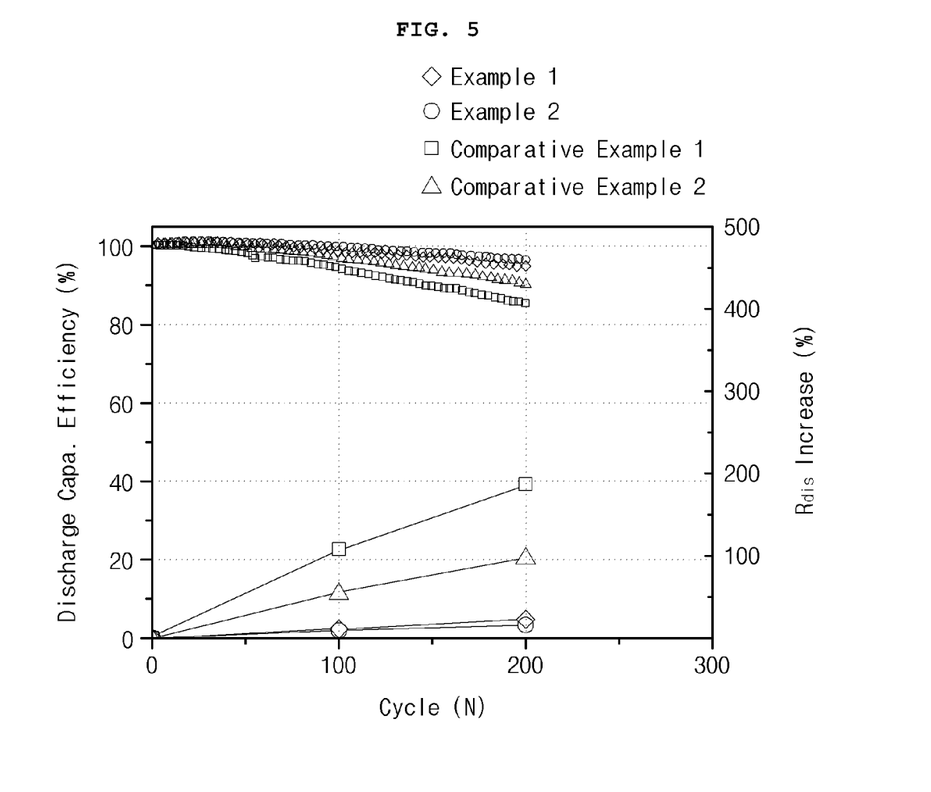
FIG. 5 is a graph showing discharge capacity and resistance increase of a battery according to cycles for batteries in Examples 1 and 2 and Comparative Examples 1 and 2.

In the graph of FIG. 5, a left y-axis represents the discharge capacity (%) of each cycle when the discharge capacity of the first cycle is set as 100%, and a right y-axis represents an increasing rate (%) of the battery resistance of each cycle compared with the battery resistance of the first cycle.

The battery resistance was derived from a reducing voltage when a current of 3 C was applied for 30 seconds in a state that 50% of the total battery capacity was charged.

TABLE 2

| | Discharge capacity at 200 cycles (%) | Increasing rate of battery resistance at 200 cycles (%) |
|---|---|---|
| Example 1 | 95.03 | 20 |
| Example 2 | 96.4 | 16 |
| Comparative Example 1 | 85.24 | 185 |
| Comparative Example 2 | 90.41 | 96 |

Referring to FIG. 5 and Table 2, it could be confirmed that the batteries in Examples 1 and 2, in which the average length of the multi-walled carbon nanotube contained in the positive electrode active material layer was 1-2 μm and the length standard deviation was 0.5 μm or less, had the higher capacity retention rate and the battery resistances thereof were much less increased compared with Comparative Examples 1 and 2.

Specifically, in Comparative Example 1, the average length of the multi-walled carbon nanotube satisfied 1-2 μm, but the length standard deviation was 0.81 μm which was an exceeding value of 0.5 μm. That is, it may be considered that Comparative Example 1 includes multi-walled carbon nanotubes having excessively various lengths, and as a result, aggregation occurs between the multi-walled carbon nanotubes due to some multi-walled carbon nanotubes having the excessively long lengths, whereby the multi-walled carbon nanotubes cannot uniformly be dispersed in the positive electrode active material layer. Accordingly, it may be confirmed that the capacity retention rate and the resistance characteristics of the battery are deteriorated.

In Comparative Example 2, the length standard deviation satisfied 0.5 μm or less, but the average length of the multi-walled carbon nanotubes was 0.78 μm which did not satisfy the range of 1-2 μm. That is, the lengths of the multi-walled carbon nanotubes are excessively short, and as a result, electrical connections between the positive electrode active materials cannot smoothly be formed. Accordingly, it may be confirmed that the capacity retention rate and the resistance characteristics of the battery are deteriorated.

The invention claimed is:

1. A lithium ion battery comprising:
a first electrode, a second electrode, an electrolyte, and a separator interposed between the first electrode and the second electrode,
wherein the first electrode comprises a current collector and a first electrode active material layer disposed on the current collector,
wherein the first electrode active material layer comprises a lithium oxide containing at least one transition metal, multi-walled carbon nanotubes, and a binder,
wherein the multi-walled carbon nanotubes have an average length of 1 μm to 2 μm and a length standard deviation at 0.5 μm or less,
wherein no multi-walled carbon nanotube having a length exceeding 3 μm is included in the first electrode active material layer,
wherein the first electrode active material layer contains the multi-walled carbon nanotubes in an amount from 0.1 wt. % to 1 wt. % with respect to a total weight of the first electrode active material layer.

2. The lithium ion battery of claim 1, wherein substantially all of the multi-walled carbon nanotubes in the first electrode active material layer have the length of 0.5 μm to 3 μm with an average length of 1 μm to 2 μm and a length standard deviation at 0.5 μm or less.

3. The lithium ion battery of claim 1, wherein the first electrode active material layer comprises a conductive material which consists essentially of the multi-walled carbon nanotubes having the length of 0.5 μm to 3 μm with an average length of 1 μm to 2 μm and a length standard deviation at 0.5 μm or less.

4. The lithium ion battery of claim 1, wherein the length of the multi-walled carbon nanotubes observable in the first electrode active material layer is between 0.5 μm and 3 μm.

5. The lithium ion battery of claim 1, wherein the length of the multi-walled carbon nanotubes observable in the first electrode active material layer is under 2.5 μm.

6. The lithium ion battery of claim 1, wherein the multi-walled carbon nanotubes observed in the first electrode active material layer have the length of 0.5 μm to 3 μm with an average length of 1 μm to 2 μm and a length standard deviation at 0.5 μm or less.

7. The lithium ion battery of claim 1, wherein the average length of the multi-walled carbon nanotubes observed in the first electrode active material layer is from 1 μm to 1.4 μm.

8. The lithium ion battery of claim 1, wherein the length standard deviation of the multi-walled carbon nanotubes observable in the first electrode active material layer is from 0.3 μm to 0.5 μm.

9. The lithium ion battery of claim 1, wherein the first electrode active material layer contains the multi-walled carbon nanotubes in an amount from 0.2 to 0.7 wt. % with respect to the total weight of the first electrode active material layer.

10. The lithium ion battery of claim 1, wherein the first electrode active material layer contains the lithium oxide containing at least one transition metal in an amount from 96 to 99 wt. % with respect to a total weight of the first electrode active material layer.

11. The lithium ion battery of claim 1, wherein the lithium oxide containing at least one transition metal comprising at least one selected from the group consisting of lithium cobalt oxide, lithium nickel oxide, lithium manganese oxide, lithium copper oxide, vanadium oxide, lithium nickel composite oxide, and lithium manganese composite oxide.

12. A method of making the lithium ion battery of claim 1, the method comprising:
providing a first electrode slurry comprising a lithium oxide containing at least one transition metal, multi-walled carbon nanotubes, a dispersant, a binder, and a solvent;
applying the first electrode slurry onto a current collector; and
subsequently drying the first electrode slurry on the current collector to evaporate the solvent and to provide on the current collector the first electrode active material layer of the lithium ion battery,
wherein the multi-walled carbon nanotubes have an average length of 1 μm to 2 μm and a length standard deviation at 0.5 μm or less,
wherein no multi-walled carbon nanotube having a length exceeding 3 μm is included in the first electrode active material layer,
wherein the first electrode active material layer contains the multi-walled carbon nanotubes in an amount from 0.1 wt. % to 1 wt. % with respect to a total weight of the first electrode active material layer.

13. The method of claim 12, wherein substantially all of the multi-walled carbon nanotubes in the first electrode active material layer have the length of 0.5 μm to 3 μm with an average length of 1 μm to 2 μm and a length standard deviation at 0.5 μm or less.

14. The method of claim 12, wherein the first electrode active material layer comprises a conductive material which consists essentially of the multi-walled carbon nanotubes having the length of 0.5 μm to 3 μm with an average length of 1 μm to 2 μm and a length standard deviation at 0.5 μm or less.

15. The method of claim 12, wherein the length of the multi-walled carbon nanotubes observable in the first electrode active material layer is between 0.5 μm and 3 μm.

16. The method of claim 12, wherein the length of the multi-walled carbon nanotubes observable in the first electrode active material layer is under 2.5 μm.

17. The method of claim 12, wherein the multi-walled carbon nanotubes observed in the first electrode active material layer have the length of 0.5 μm to 3 μm with an average length of 1 μm to 2 μm and a length standard deviation at 0.5 μm or less.

18. The method of claim 12, wherein the average length of the multi-walled carbon nanotubes contained in the first electrode slurry is from 1 μm to 1.4 μm.

19. The method of claim 12, wherein the length standard deviation of the multi-walled carbon nanotubes contained in the first electrode slurry is from 0.3 μm to 0.5 μm.

20. The method of claim 12, wherein the first electrode slurry contains the multi-walled carbon nanotubes in an amount from 0.2 to 0.7 wt. % with respect to the total weight of the first electrode slurry excluding the solvent.

21. The method of claim 12, wherein providing the first electrode slurry comprises:
providing a mixture comprising bundle-type multi-walled carbon nanotubes and the dispersant; and
processing the mixture to unbundle at least part of the bundle-type multi-walled carbon nanotubes to provide the multi-walled carbon nanotubes having a length between 0.5 μm and 3 μm with an average length from 1 μm to 2 μm and a length standard deviation at 0.5 μm or less.

22. The method of claim 21, wherein processing the mixture comprises providing the first electrode slurry comprises milling the mixture.

* * * * *